United States Patent
Yoon et al.

(10) Patent No.: US 8,966,348 B2
(45) Date of Patent: Feb. 24, 2015

(54) MEMORY ERROR IDENTIFICATION BASED ON CORRUPTED SYMBOL PATTERNS

(71) Applicant: Hewlett-Packard Development Company, L.P., Houston, TX (US)

(72) Inventors: Doe Hyun Yoon, San Jose, CA (US); Jichuan Chang, Sunnyvale, CA (US); Naveen Muralimanohar, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 73 days.

(21) Appl. No.: 13/689,814

(22) Filed: Nov. 30, 2012

(65) Prior Publication Data
US 2014/0157054 A1    Jun. 5, 2014

(51) Int. Cl.
*G06F 11/00* (2006.01)
(52) U.S. Cl.
CPC ..................... *G06F 11/006* (2013.01)
USPC ............. 714/776; 714/718; 714/E11.159
(58) Field of Classification Search
CPC ... H04L 1/0061; H04L 1/0041; H04L 1/0083; H04L 1/0072
USPC ..................... 714/718, 776, E11.159
See application file for complete search history.

(56) References Cited

U.S. PATENT DOCUMENTS

| | | | |
|---|---|---|---|
| 5,553,231 A * | 9/1996 | Papenberg et al. | 714/5.11 |
| 6,516,436 B1 * | 2/2003 | Dave et al. | 714/753 |
| 6,697,921 B1 * | 2/2004 | Aoki | 711/154 |
| 7,379,316 B2 | 5/2008 | Rajan | |
| 7,620,875 B1 | 11/2009 | Nelson et al. | |
| 7,721,140 B2 | 5/2010 | Dell et al. | |
| 7,949,931 B2 | 5/2011 | Lastras-Montano | |
| 8,041,990 B2 | 10/2011 | O'Connor et al. | |
| 8,171,377 B2 | 5/2012 | Dell et al. | |
| 8,185,800 B2 | 5/2012 | Coteus et al. | |
| 2007/0058410 A1 * | 3/2007 | Rajan | 365/63 |
| 2009/0006900 A1 * | 1/2009 | Lastras-Montano et al. | 714/42 |
| 2009/0327596 A1 * | 12/2009 | Christenson et al. | 711/105 |
| 2010/0287445 A1 * | 11/2010 | Dell et al. | 714/763 |
| 2011/0219197 A1 * | 9/2011 | Perego et al. | 711/154 |
| 2013/0326293 A1 * | 12/2013 | Muralimanohar et al. | 714/718 |
| 2014/0143633 A1 * | 5/2014 | Campbell et al. | 714/764 |

OTHER PUBLICATIONS

Intel E7500 Chipset MCH Inelx4 Single Device Data Correction (x4 SDDC) Implementation and Validation, Aug. 2002.

* cited by examiner

*Primary Examiner* — Albert Decady
*Assistant Examiner* — Kyle Vallecillo
(74) *Attorney, Agent, or Firm* — Hewlett-Packard Patent Department (57) ABSTRACT

A system includes a memory controller, a buffer, a first channel to couple the memory controller to the buffer, and a second channel to couple the buffer to a memory. The first channel and second channel are to transmit a codeword including a plurality of symbols. A symbol is formed from a plurality of bursts based on data access of the memory. The memory controller is to identify a memory error based on a corrupted symbol pattern of the codeword. The memory controller is to discriminate between a chip failure, a first pin failure of the first channel, and a second pin failure of the second channel, as being a type of the memory error, according to the corrupted symbol pattern.

15 Claims, 5 Drawing Sheets

MEMORY ERROR IDENTIFICATION BASED ON CORRUPTED SYMBOL PATTERNS

BACKGROUND

System reliability in computer systems can be affected by system memory, which can be a common source of system failures. Memory modules, such as dual in-line memory modules (DIMMs), may use error-correcting code (ECC) to detect and correct some memory errors. However, ECC may be applied inefficiently and without discriminating between different types of memory failures. This may lead to unnecessary replacement of a memory module, even though the error may be related to a memory channel failure and not the memory module itself.

DETAILED DESCRIPTION

Example systems described herein are capable of discriminating between different types of pin failures and chip failures, and may enable stronger protection for errors without a need for increased ECC overhead. These benefits are compatible with buffered memory systems. ECC codeword symbols may be reorganized, to leverage burst access of the memory. A memory controller can analyze a corrupted symbol pattern in codeword symbols, and take different actions for different types of memory errors, thereby improving memory system reliability.

An example system may include a memory controller; a buffer; a first channel, and a second channel. The first channel has a first channel width to couple the memory controller to the buffer, and the second channel has a second channel width to couple the buffer to a memory. The first channel width may differ from the second channel width. The first channel and second channel are to transmit a codeword including a plurality of symbols. A symbol is formed from a plurality of bursts based on data access of the memory. The memory controller is to identify a memory error based on a corrupted symbol pattern of the codeword, and discriminate between a chip failure, a pin failure of the first channel, and a pin failure of the second channel, as being the type of memory error, according to the corrupted symbol pattern.

Figure 1:
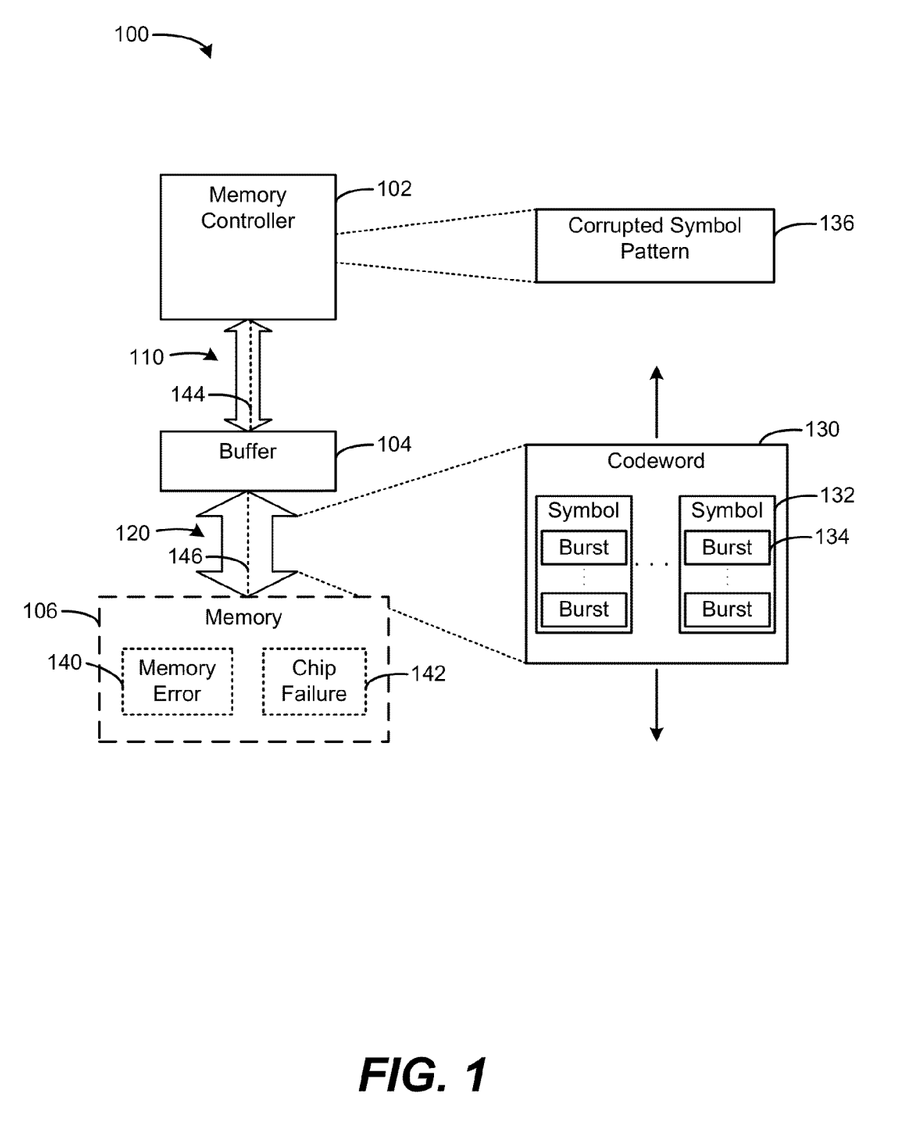
FIG. 1 is a block diagram of a system including a memory controller according to an example.

FIG. 1 is a block diagram of a system 100 including a memory controller 102 according to an example. System 100 also includes a first channel 110, buffer 104, and second channel 120. The first channel 110 is to couple the memory controller 102 to the buffer 104, and the second channel 120 is to couple the buffer 104 to a memory 106. The system 100 is to interact with a codeword 130, which may be transmitted via the first channel 110 and/or the second channel 120. The codeword 130 includes a plurality of symbols 132. A symbol 132 includes a plurality of bursts 134. The memory controller 102 is to identify a corrupted symbol pattern 136 based on the codeword 130. The memory controller 102 also is to discriminate a type of memory error 140, based on the corrupted symbol pattern 136. Thus, the memory controller 102 may determine whether the memory error 140 is based on a chip failure 142 in the memory 106, a first pin failure 144 of the first channel 110, and a second pin failure 146 of the second channel 120.

The first channel 110, buffer 104, and second channel 120 enable the memory controller 102 to interact with the memory 106 based on buffering. Buffer 104, and memory 106, are each shown as a single block for convenience. However, buffer 104 may represent multiple buffers, and memory 106 may represent multiple separate memories (e.g., memory modules). For example, multiple buffers 104 may be associated with the first channel 110, and the second channel 120 may be connected to multiple memory ranks. A buffered memory system may use channels of different widths. For example, the memory 106 may interface with the second channel 120 based on a much wider data path than the first channel 110 (the data path between the buffer 104 and the memory controller 102). In an example, the second channel 120 on one side of the buffer 104 may have a 144-bit wide channel, and first channel 110 on the other side of the buffer 104 may have a 72-bit wide channel. Thus, the first channel 110 and second channel 120 have different widths. A high-end system may have a buffer 104 on-board, with a narrow bus, e.g., a first channel 110 having a 20-bit width running at much higher frequency compared to the second channel 120 (e.g., a 144-bit wide channel or similar). Thus, in a buffered memory system, one side of the buffer is narrower and faster, and the other side of the buffer is wider and slower. The widths may reflect a ratio, such as a 1:2 ratio, in terms of channel width. Thus, the narrower channel may run proportionally faster than the wider channel.

Accordingly, the codeword 130 may be transmitted across the second channel 120 based on a wide interface, but a shape of the codeword 130 may be reorganized when transmitted over the narrower interface of the first channel 110 such that the symbols 132 are aligned differently relative to pins in the channel. Accordingly, it may be inappropriate to treat all pin failures generically as a subset of chip failures; because the reorganized codeword 130 may be affected differently from a pin failure in the first channel 110 in view of the reorganized codeword 130 and different channel widths. Example systems provided herein may organize the codeword 130 to efficiently tolerate pin failures on either channel in the buffered system having different channel widths, discriminating between different types of pin failures and chip failures. For example, the corrupted symbol pattern 136, arising in view of codeword organization, may enable example systems to correct and identify the different types of errors.

Figure 2:
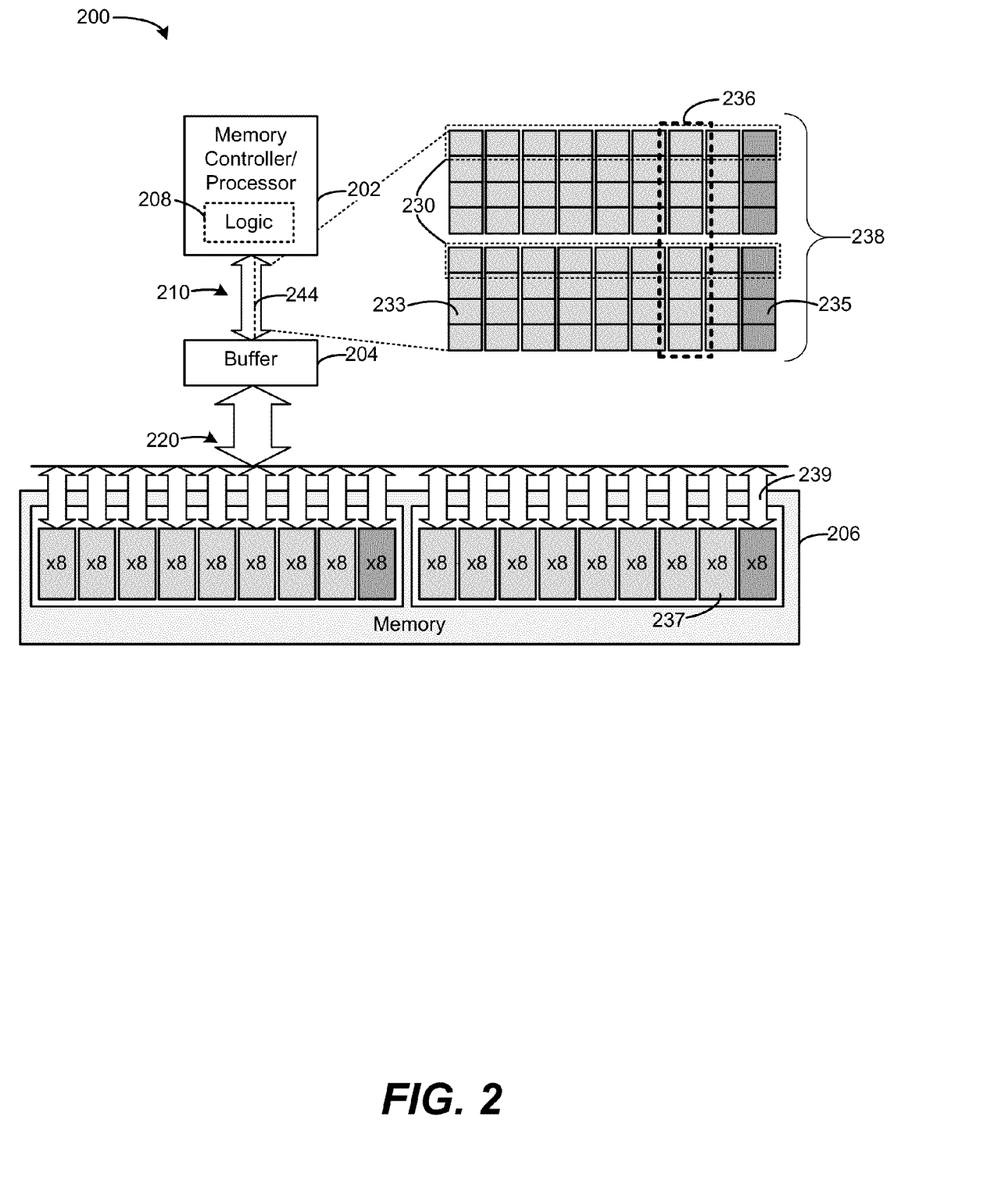
FIG. 2 is a block diagram of a system including a memory controller according to an example.

FIG. 2 is a block diagram of a system 200 including a memory controller 202 according to an example. System 200 also includes a first channel 210, buffer 204, and second channel 220 to interface with memory 206. The first channel 210 and second channel 220 may transmit data block 238. The data block 238 includes a plurality of data symbols 233 and check symbols 235. The memory controller 202 is to identify a corrupted symbol pattern 236 (one type of pattern is shown, others are possible) of a codeword 230, which may be based on logic 208. The memory controller 202 is to determine a type of memory error, such as a first pin failure 244 of the first channel 210 causing the corrupted symbol pattern 236. The memory 206 includes a plurality of chips 237 that interface with the second channel 220 via chip outputs 239.

To protect memory 206 from various sources of errors, error checking and correcting (ECC) codes may be applied to memory 206. An ECC dual in-line memory module (DIMM) is a memory module that may include dynamic random access memory (DRAM) chips for data as well as ECC. In an example, the memory 206 includes two memory modules, each being a DIMM having a 72-bit wide data interface, including 64-bit data and 8-bit ECC. Details of the ECC mechanism may vary based on system designers for different examples. An example may use single bit-error correcting and double bit-error detecting (SEC-DED) code. An 8-bit SEC-DED code can correct 1-bit errors and detect 2-bit errors. Being able to correct 1-bit errors also means that a pin failure may be tolerated (depending on the arrangement of the codeword 230), if a pin failure appears to be a 1-bit failure per access (e.g., in the second channel 220). FIG. 2 illustrates two ECC DIMMs, each having 9×8 DRAM chips 237. Data chips are shown in light gray, and ECC chips are show in darker gray. A x8 DRAM has 8 data pins, although other types of chips may be used.

System 200 may combine the two ECC DIMMs together to form a 144-bit wide channel, with 128 bits of data and 16 bits of ECC. An example approach would be to apply an 8-bit symbol-based Reed-Solomon (RS) code horizontally across the entire 144-bit wide channel. If using burst 4 access, because the total ECC is applied horizontally, the actual burst number (e.g., burst 4, burst 8, and so on) may be varied. Burst 4 is used for clarification and other burst values may be used. DRAMs based on increasing data rates may involve burst lengths longer than 4 or 8, so using, e.g., 2 burst 4 bit or 4 burst 2 bit organization would not affect DRAM behavior regarding the burst transfer. DRAM behavior in modern DRAMs may not be affected by burst length and symbol organization, allowing for flexible combinations of memory types and performance.

The data block 238 includes a plurality of symbols, represented by a rectangular region that represents an 8-bit symbol. Because the chips 237 are x8, each burst provides 8 bits. Thus, we see the data block 238 includes, along a horizontal axis as illustrated, a symbol corresponding to each chip 237. Because the memory 206 is burst 4, the data block 238 includes, along a vertical axis as illustrated, 4 rows of symbols. Note that the data block 238 is shown in a "stacked" or "folded" manner, where half of the data block 238 is positioned above the other half, corresponding to transmission over the narrower first channel 210. However, the symbols in each half are stacked 4 high corresponding to burst 4.

Other symbol organizations are possible. The data block 238 is shown as a folded organization example, with a first set of four bursts (e.g., corresponding to the left DIMM of the memory 206) being transmitted, followed by the second set of four bursts (e.g., corresponding to the right DIMM of memory 206). However, the contents may be interleaved, or arranged in other ways. For example, the first burst of the left DIMM may be sent, followed by the first burst of the right DIMM, then the second burst of the left DIMM, followed by the second burst of the right DIMM, then the third, and so on. Thus, references to the data block 238 being folded also may include other variations of symbol organizations, such as interleaved and so on, to arrange the symbols for a narrower symbol arrangement corresponding to the narrower channel width.

The symbols that form the data block 238 (and codeword 230) may include a data symbol 233 and a check symbol 235. Each codeword 230 may include 16 data symbols 233 and two check symbols 235. The block 238 is shown including a burst of 4 codewords 230 stacked vertically. A two check symbol Reed Solomon code may correct one symbol error, which may correspond to a chip failure that affects one symbol per region of ECC code. Therefore, with this 2 check symbol ECC code and 144-bit wide channel organization, it is possible to correct a chip failure. Thus, the system 200 supports chipkill protection.

Example systems may experience various errors, including a single-bit error, a multi-bit error, complete row failure, or any internal logic failure. There may be input/output (I/O) pin failures, permanent errors, intermittent errors, latent errors, and other errors. All of these types of errors may be detected and/or corrected. Regardless of how the errors manifest, if those errors are confined to a single chip, chipkill may be used to protect against them. However, due to the folded organization of the data block 238 in view of the different widths of the first channel 210 and second channel 220, errors associated with a pin may manifest differently, and other techniques also may be applied for detection and/or correction.

In example systems (e.g., high-end servers), chipkill-correct may be used to tolerate chip failures and pin failures. Symbol-based Reed-Solomon (RS) codes may be used to implement chipkill-correct, and a wide channel configuration (128-bit data and 16-bit ECC, by tying two ECC DIMMs in lock-step mode) may be used to limit ECC overhead to 12.5%. FIG. 2 illustrates a memory channel configuration for chipkill-correct, with a data and ECC block 238 with burst 4 access (burst 4 is used as an example, but this approach is applicable to other types of access, e.g., burst 8 in DDR3). Each access is composed of 16 data symbols and 2 check symbols (using 8-bit symbols).

Using the example burst 4 access, at each read in this 144-bit wide channel, the system 200 is to access 64 bytes of data from the DRAM memory 206, in view of the 144-bit wide channel. The 64-byte data will be transferred as shown in the block 238. For example, a width of the first channel 210 (between the memory controller 202 and the buffer 204) may be narrower (e.g., 72-bits wide) than the 144-bit wide read from the memory. This difference in channel widths may result in organization where the data originates as a wide shape for the second channel 220, and is folded to a narrower shape for the first channel 210.

However, if there is a pin failure in the first channel 210 (between the memory controller 202 and the buffer 204), a larger number of symbols will be affected, because each pin in the first channel 210 transfers twice as much information (in this particular example demonstrating a 1:2 channel width ratio; other ratios are possible, including non-integer ratios). For example, the second channel 220 may be twice as wide as the first channel 210, so data from the wide second channel 220 will need to be transferred over a narrower data bus. Thus, symbols corrupted by a pin failure on the first channel 210 may affect two symbols in the codeword 230. The affected symbols may form a corrupted symbol pattern 236. Thus, a single pin in the first channel 210 may affect an entire column of the folded block 238, corrupting those symbols corresponding to that column (i.e., two symbols per each of the four codewords 230).

The 16 data symbol, 2 check symbol ECC codeword 230 is shown formed in a folded shape because the data layout is changed and transferred over a narrower channel. Thus, a chip failure is correctable because it causes merely a single-symbol error in codeword 230. However, the symbols corrupted by a pin failure in the first channel 210 appear as two symbol errors per ECC codeword 230, which may not be correctable using chipkill described above for this arrangement of 8-bit symbols.

A pin failure in the second channel 220, in cases where the second channel 220 is as wide as the memory 206, can be considered to be a subset of a chip failure, because one pin failure would affect one of the multiple pins of a chip 237. Such a pin failure may be corrected as described above. However, a pin failure on the first channel 210, between the buffer 204 and the memory controller 202, is not a subset of a chip failure because the buffered system using different channel widths and folded arrangement of the codeword may cause more than one symbol to be corrupted. In this arrangement, because each chip produces a symbol, corruption of more than one symbol is comparable to corruption of more than one chip. Thus, a single pin failure in the first channel 210 may cause corruption to symbols as though multiple chips have failed.

However, by changing the organization of the symbols in view of the different channel widths, it is possible to identify whether a memory error is due to a pin failure in the first channel 210, a pin failure in the second channel 220, or a chip failure of the memory 206. Further, error correction may be able to handle more errors compared to other organization schemes, by changing a number of symbols across the width of the block 238. Thus, the system 200 may inform the operating system and system administrator, providing different guidance to take different actions for different types of failures. Examples provided herein are usable in buffered memory systems where a pin failure is not a subset of a chip failure, and may tolerate pin failures in the first channel 210. By discriminating between types of chip failures and/or pin failures; an administrator may be advised to avoid unnecessarily replacing a good DIMM in an attempt to address a pin failure (e.g., a stuck-at fault), increasing efficiency and preventing waste. Depending on memory configurations, examples herein may potentially tolerate a larger number of pin failures (DRAM pin failures) than other chipkill schemes.

Memory controller 202 may interact with a separate processor, and/or operate as a processor, to perform various functions. Such functionality may be based on logic 208. Additional interaction may be such that the memory controller 202 detects and corrects memory errors based on logic 208, and reports some information to (and collects statistics for) a processor, so that even at runtime, a report can be generated regarding memory status. A processor may be used separately from the memory controller 202, and/or processor functionality (e.g., logic 208) may be integrated with the memory controller 202.

The memory controller 202 may report to the processor such that error information may be available to an operating system (OS) and provided for use by a system operator. For example, if there is a chip failure, even though the system 200 can tolerate that failure, another failure may exceed the error correction capabilities of a given error correction scheme. Thus, the faulty memory module should be replaced soon, before another error compounds the problem. The memory controller 202 may report location information to a processor regarding faulty memory, the processor may inform a software layer, and then a system administrator may be notified to physically replace the faulty memory.

In response to a pin failure 244 in the first channel 210, the system 200 may disable the first channel 210. Disabling the first channel 210 may involve a hardware operation such that the memory controller 202 reports the error situation to the OS, and that memory on the affected channel might become unavailable (e.g., if there is an additional failure on the channel, such as on a memory associated with that channel). The memory controller 202 may provide information to the runtime OS to copy all the data, from memory on the affected channel, to a different channel. The memory controller 202 then may physically (e.g., at a memory controller hardware layer) disable this channel.

In response to a pin failure in the second channel 220, a similar OS runtime software operation may be initiated by the memory controller 202. All data in the memory associated with the channel (i.e., the memory 206 connected to the second channel) may be relocated to another unaffected location, and the particular memory 206 affected by the second channel 220 may be disabled (thereby disabling the second channel 220). Because a failure in the second channel 220 is likely localized in the particular DIMM associated with the second channel, the loss of memory functionality may involve less data than the first case above (because just the particular DIMMs are affected).

More specifically, there can be multiple DIMMs per channel, so in the first case, access to all the numerous DIMMs associated with the first channel 210 may be disabled. Thus, in an example system having four memory channels, one quarter of its total memory capacity may be lost by disabling the first channel 210. However, in the second case, if there are 4 DIMMs per channel, then only one memory DIMM may be lost, so the penalty would be one sixteenth of the total memory capacity. Accordingly, discriminating which of the channels has an error is very beneficial to system operation and efficient memory management, to avoid unnecessarily disabling and/or replacing memory and/or channels.

Figure 3A:
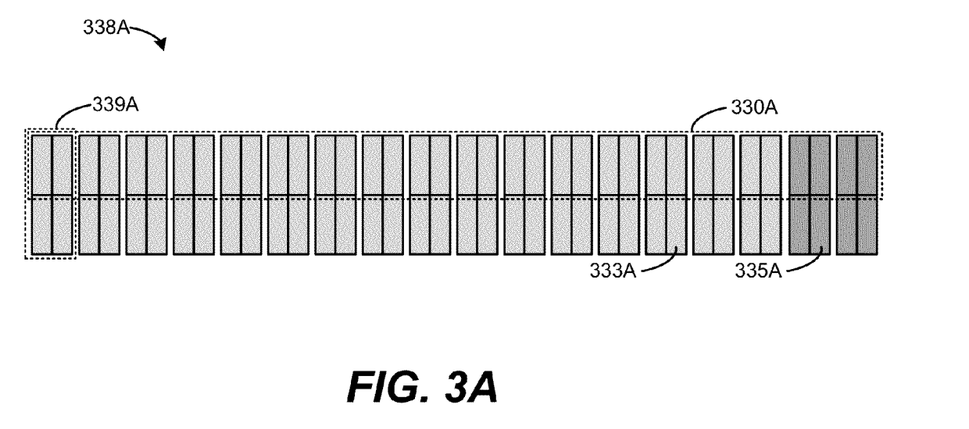
FIG. 3A is a block diagram of a data block including a data symbol according to an example.

FIG. 3A is a block diagram of a data block 338A including a data symbol 333A according to an example. The data block 338A also includes a check symbol 335A, codeword 330A, and chip output 339A. A symbol (data symbol 333A, check symbol 335A) is narrower (fewer bits wide) and taller (greater number of bits tall).

Thus, the arrangement of block 338A takes advantage of a narrower symbol organization compared to earlier examples. Instead of constructing an 8-bit symbol using 8 bits out of a DRAM chip, a subset of the bits from a chip may be used, in multiple bursts, to provide the full set of bits for that symbol. In an example, a 2-burst of 4 bits may be used to construct an 8-bit symbol, taller than it is wide. Other combinations may be used (e.g., a 4 burst of 2 bits), though not specifically illustrated. Such narrow and tall arrangement is able to take advantage of burst access provided by DDRx DRAM systems. Such DRAM systems may provide n-bit prefetch and burst n access to meet the gap between the slow DRAM core speed and fast bus speed: n is 1 for single-data-rate SDRAM (synchronous DRAM), 2 in DDR, 4 in DDR2, 8 in DDR3, and so on. Constructing an 8-bit symbol from 2-burst of 4 bits does not affect DRAM scheduling nor DRAM access behavior.

FIG. 3A illustrates how data symbols 333A and ECC (check symbols 335A) may be organized using 2-burst 4-bit symbols. For each 2-burst access, there are 32 data symbols 333A and 4 check symbols 335A. An ECC codeword 330A may be composed of 32 data symbols 333A and 4 check symbols 335A. Thus, the block 338A includes two codewords 330A. The 4 check symbol 335A error codes can correct 2 symbol errors. A 64 byte data block 338A is composed of two sets of codewords 330A. When this block 338A is transferred over a narrow channel, its shape may be folded as in earlier examples. However, corrupted symbol patterns would be different due to the taller/narrower type of symbols. Chip failures, pin failures at the DRAM side (second channel), and pin failures at the memory controller side (first channel), manifest differently based on different corrupted symbol patterns. A pin failure at the memory controller side (first channel) would affect up to 2 symbols per code word.

However, with narrow symbols, and 4 check symbol 335A error codes, it is possible to correct the 2 corrupt symbols in the codeword 330A caused by the pin failure in the first channel. Thus, not only does the symbol arrangement in block 338A enable correction of chip and pin failures, but also enables identification of the type of problem, depending on the corrupted symbol pattern that appears at the memory controller by analyzing the ECC encoding.

Figure 3B:
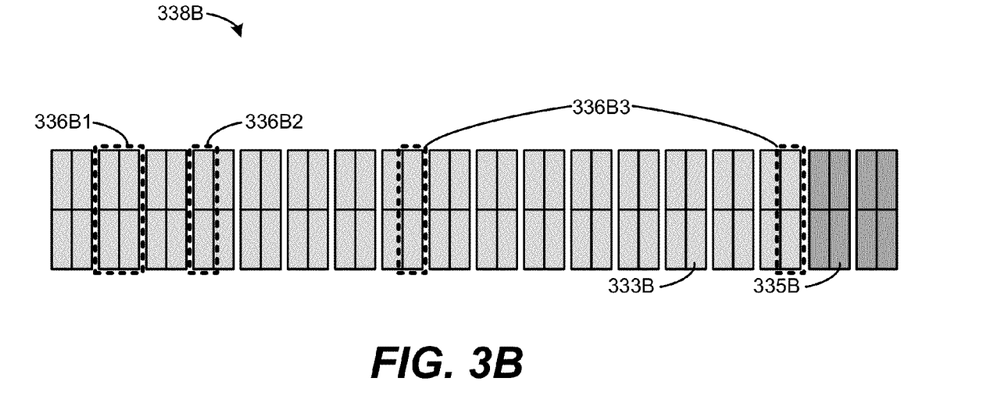
FIG. 3B is a block diagram of a data block including a data symbol according to an example.

FIG. 3B is a block diagram of a data block 338B including a data symbol 333B according to an example. The data block 338B also includes a check symbol 335B. FIG. 3B illustrates a first corrupted symbol pattern 336B1, a second corrupted symbol pattern 336B2, and a third corrupted symbol pattern 336B3.

The first corrupted symbol pattern 336B1 includes two adjacent symbols in a first codeword, along with another two adjacent symbols in the second codeword. Thus, a memory controller may recognize that corruption is causing the same adjacent symbols in successive codewords to become corrupted. Because a chip may provide output for multiple narrow symbols over multiple bursts, the memory controller can conclude that the first corrupted symbol pattern 336B1 corresponds to a chip failure.

The second corrupted symbol pattern 336B2 shows a single corrupted symbol per codeword, without an adjacent corrupted symbol, and without a non-adjacent corrupted symbol spaced away as a function of the ratio of the first and second memory channels. Thus, the memory controller may recognize such a symbol error (e.g., one symbol per codeword), spread across both codewords, as a memory pin failure (on the second channel between the DRAMs and the memory buffer).

The third corrupted symbol pattern 336B3 shows a two non-adjacent corrupted symbols per codeword. The non-adjacent corrupted symbols may be spaced from each other as a function of the ratio of the first and second memory channels, because the errors may arise due to one pin's affect distributed to 2 symbols of the codeword by the folding of the codeword. Thus, the memory controller may recognize such symbol errors (e.g., two non-adjacent symbols per codeword), spread across both codewords, as a buffer pin failure (on the first channel between the buffer and the memory controller).

The example patterns are demonstrated with a 4-check-symbol RS code, which can correct up to 2 symbol errors. Hence, all the described failures can be tolerated, unlike other ECC schemes that are unable to correct errors equivalent to two chip failures. Furthermore, because 2 symbol errors may be tolerated/corrected, this technique is robust enough to handle 2 pin failures in the second channel, because a pin failure in the second channel affects one symbol, and the ECC scheme here provides additional check symbols per codeword due to the narrower nature of each symbol. The schemes/patterns may be modified in view of using different organizations/chips, e.g., different burst/data widths, wherein a symbol is constructed from a portion of a chip's output that is multiplied over a plurality of bursts.

Thus, if an error is corrected, by analyzing the corrupted symbol pattern, the memory controller may identify which type of failure the error stems from. This can be used to improve pin failure tolerance capability. In decoding an ECC in an example, the memory controller may identify which symbol is faulty, and once the faulty symbol location is determined, then the error may be corrected. Thus, by performing error correction, the memory controller (e.g., correction logic) may determine which symbols are corrupted, and may thereby collect corruption location information to analyze how and/or which symbols are corrupted in the entire data block (e.g., 64 byte or 128 byte). The example schemes can provide much higher reliability/availability due to the increased capacity for handling errors.

Not only can examples handle and correct errors, but also notify to the software or system administrator in terms of very specific failure information, such as a pin failure at a specific DIMM chip, a pin failure at the memory controller, and so on, empowering the administrator to take different actions as appropriate and avoiding wasteful memory replacements when the problem is instead caused by a pin failure at the memory controller (because even if the DIMM is replaced, the faulty pin will still cause errors).

Examples herein enable enhancements to detection and correction, especially beneficial to buffered memory systems having different channel widths between the two data buses. However, examples described herein are applicable to systems having first and second channels of the same width, because examples enable differentiation of pin failure types and toleration of additional pin failures.

Figure 4:
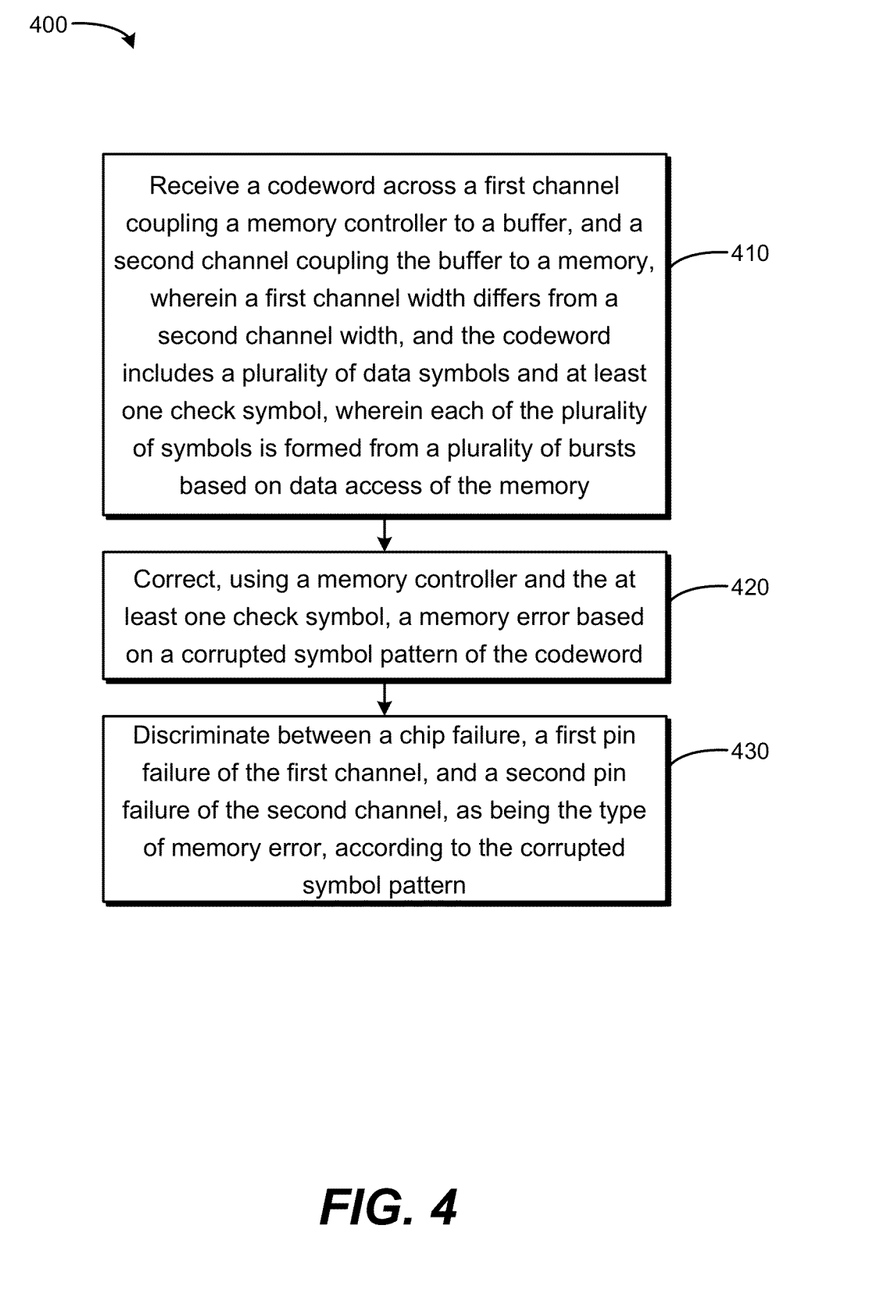
FIG. 4 is a flow chart based on discriminating a type of memory error according to an example.

FIG. 4 is a flow chart 400 based on discriminating a type of memory error according to an example. In block 410, a codeword is transmitted across a first channel coupling a memory controller to a buffer, and a second channel coupling the buffer to a memory, wherein a first channel width differs from a second channel width, and the codeword includes a plurality of data symbols and at least one check symbol, wherein each of the plurality of symbols is formed from a plurality of bursts based on data access of the memory. For example, an 8-pin memory chip may provide data for two symbols at a time, and over a four burst access provide 4 8-bit symbols, each symbol fed by four of the pins. In block 420, a memory error is corrected, using a memory controller and the at least one check symbol, based on a corrupted symbol pattern of the codeword. For example, the corrupted symbol pattern may include two non-adjacent corrupted symbols that are corrected. In block 430, a chip failure, a pin failure of the first channel, and a pin failure of the second channel, are discriminated between as being the type of memory error, according to the corrupted symbol pattern. For example, the corrupted symbol pattern of two non-adjacent corrupted symbols may be detected as a pin failure of the first channel.

Figure 5:
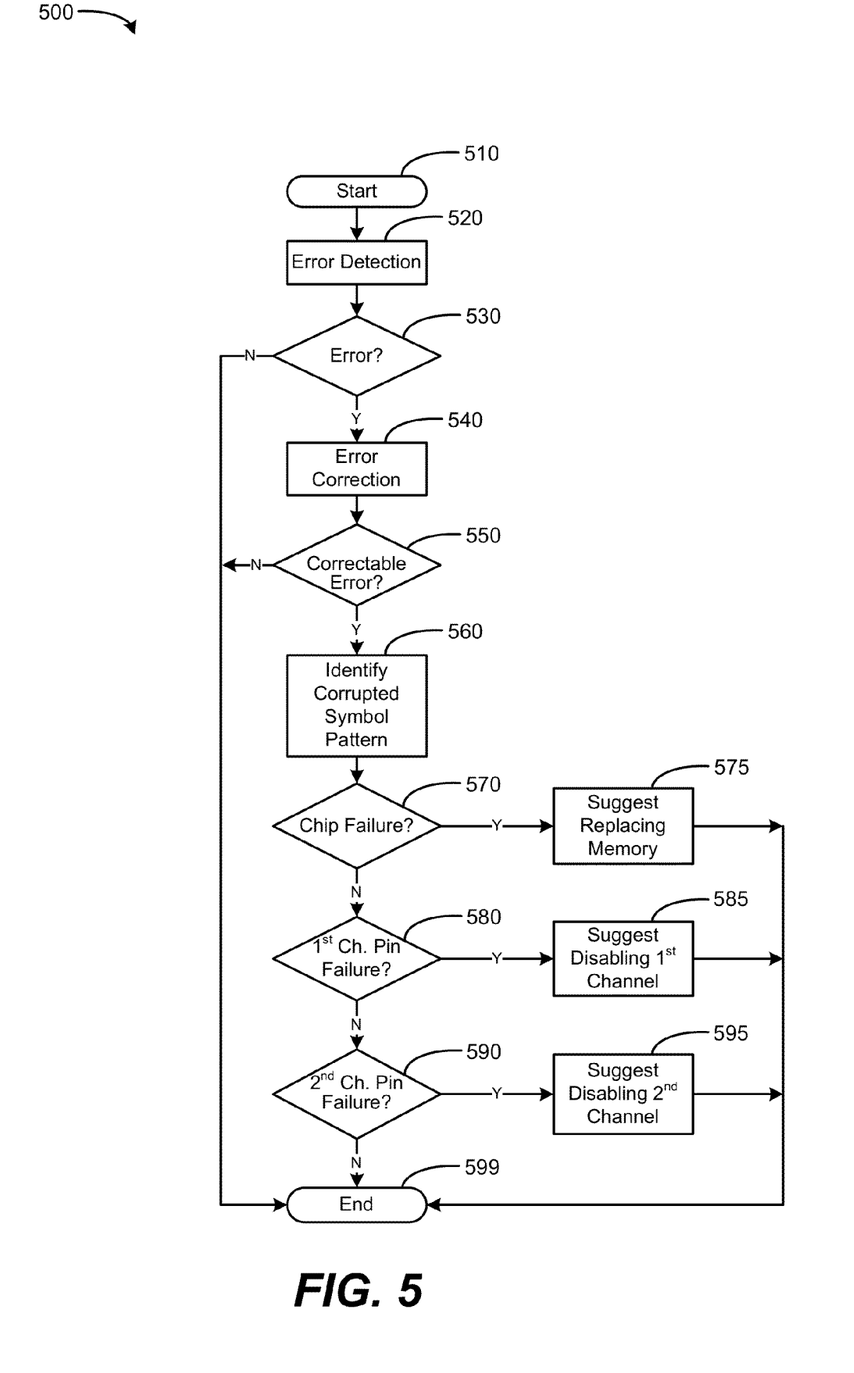
FIG. 5 is a flow chart based on discriminating a type of memory error according to an example.

FIG. 5 is a flow chart 500 based on discriminating a type of memory error according to an example. Flow starts in block 510. In block 520, error detection is applied. In block 530, it is determined whether there is an error. If there is not an error, flow proceeds to end at block 599. If there is an error, flow proceeds to block 540. In block 540, error correction is applied. In block 550, it is determined whether there is a correctable error. If there is not a correctable error, flow proceeds to end at block 599. If there is a correctable error, flow proceeds to block 560. In block 560, a corrupted symbol pattern is identified. In block 570, it is determined whether there is a chip failure. If there is a chip failure, flow proceeds to block 575. In block 575, it is suggested to replace a memory, and flow proceeds to end at block 599. If, in block 570, there is not a chip failure, flow proceeds to block 580. In block 580, it is determined whether there is a first channel pin failure. If there is a first channel pin failure, flow proceeds to block 585. In block 585, it is suggested to disable the first channel, and flow proceeds to end at block 599. If, in block 580, there is not a first channel pin failure, flow proceeds to block 590. In block 590, it is determined whether there is a second channel pin failure. If there is a second channel pin failure, flow proceeds to block 595. In block 595, it is suggested to disable the second channel, and flow proceeds to end at block 599. If, in block 590, there is not a second channel pin failure, flow proceeds to end at block 599.

Those of skill in the art would appreciate that the various illustrative components, modules, and blocks described in connection with the examples disclosed herein may be implemented as electronic hardware, computer software, or combinations of both. Thus, the example blocks of FIGS. 1-5 may be implemented using software modules, hardware modules or components, or a combination of software and hardware modules or components. In another example, one or more of the blocks of FIGS. 1-5 may comprise software code stored on a computer readable storage medium, which is executable by a processor. As used herein, the indefinite articles "a" and/or "an" can indicate one or more than one of the named object. Thus, for example, "a processor" can include one or more than one processor, such as in a multi-core processor, cluster, or parallel processing arrangement. The processor may be any combination of hardware and software that executes or interprets instructions, data transactions, codes, or signals. For example, the processor may be a microprocessor, an Application-Specific Integrated Circuit ("ASIC"), a distributed processor such as a cluster or network of processors or computing device, or a virtual machine. The processor may be coupled to memory resources, such as, for example, volatile and/or non-volatile memory for executing instructions stored in a tangible non-transitory medium. The non-transitory machine-readable storage medium can include volatile and/or non-volatile memory such as a random access memory ("RAM"), magnetic memory such as a hard disk, floppy disk, and/or tape memory, a solid state drive ("SSD"), flash memory, phase change memory, and so on. The computer-readable medium may have computer-readable instructions stored thereon that are executed by the processor to cause a system (e.g., a rate limit manager to direct hardware rate limiters) to implement the various examples according to the present disclosure.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
   a memory controller;
   a buffer;
   a first channel having a first channel width, to couple the memory controller to the buffer; and
   a second channel having a second channel width, to couple the buffer to a memory;
   wherein a first channel width differs from a second channel width, and the first channel and second channel are to transmit a codeword including a plurality of symbols, wherein a symbol is formed from a plurality of bursts based on data access of the memory; and
   wherein the memory controller is to identify a type of memory error based on a corrupted symbol pattern of the codeword, wherein the memory controller is to discriminate between a chip failure, a first pin failure of the first channel, and a second pin failure of the second channel, as being the type of memory error, according to the corrupted symbol pattern.

2. The system of claim 1, wherein the memory controller is to identify the type of memory error as the chip failure, based on identifying the corrupted symbol pattern including adjacent corrupted symbols per codeword.

3. The system of claim 1, wherein the memory controller is to identify the type of memory error as the pin failure of the first channel, based on identifying the corrupted symbol pattern including non-adjacent corrupted symbols per codeword.

4. The system of claim 3, wherein a spacing of the non-adjacent corrupted symbols corresponds to a function of a ratio of the first channel width and the second channel width.

5. The system of claim 1, wherein the memory controller is to identify the type of memory error as the pin failure of the second channel, based on identifying the corrupted symbol pattern including a corrupted symbol per codeword that is not adjacent to another corrupted symbol.

6. The system of claim 1, wherein the memory controller is to correct a plurality of corrupted symbols of the codeword, based on at least one check symbol included in the codeword.

7. The system of claim 1, wherein the plurality of symbols of the codeword include a check symbol for every eight data symbols.

8. The system of claim 1, wherein the memory is based on Double data rate (DDRx) synchronous dynamic random-access memory (SDRAM), where x is an integer corresponding to burst data transfer rate.

9. The system of claim 1, wherein each of the plurality of symbols is an 8-bit symbol based on a 2-burst, 4-bit transfer.

10. A method, comprising:
    receiving a codeword across a first channel coupling a memory controller to a buffer, and a second channel coupling the buffer to a memory, wherein a first channel width differs from a second channel width, and the codeword includes a plurality of data symbols and at least one check symbol, wherein each of the plurality of symbols is formed from a plurality of bursts based on data access of the memory;
    correcting, using a memory controller and the at least one check symbol, a memory error based on a corrupted symbol pattern of the codeword; and
    discriminating between a chip failure, a first pin failure of the first channel, and a second pin failure of the second channel, as being a type of the memory error, according to the corrupted symbol pattern.

11. The method of claim 10, further comprising applying an error-correcting code (ECC) to the codeword, based on the use of the check symbols.

12. The method of claim 11, wherein the ECC is Reed-Solomon coding.

13. The method of claim 12, further comprising storing an indication of a corrected first error, and correcting a second error based on the stored indication and erasure coding.

14. A non-transitory computer readable medium having instructions stored thereon executable by a processor to cause a memory controller to:
    receive a codeword across a first channel, coupling a memory controller to a buffer, and a second channel coupling the buffer to a memory, wherein a first channel width differs from a second channel width, and the codeword includes a plurality of data symbols and at least one check symbol, wherein each of the plurality of symbols is formed from a plurality of bursts based on data access of the memory;
    correct, using the memory controller and the at least one check symbol, a memory error based on a corrupted symbol pattern of the codeword; and discriminate between a chip failure, a first pin failure of the first channel, and a second pin failure of the second channel, as being a type of the memory error, according to the corrupted symbol pattern.

15. The computer readable medium of claim 14, wherein the memory controller is to provide an indication of the type of error for diagnostic purposes.

\* \* \* \* \*